(12) United States Patent
Bojsen

(10) Patent No.: US 10,091,941 B2
(45) Date of Patent: Oct. 9, 2018

(54) METHOD OF MANUFACTURING A FEED BEATER FOR AN AXIAL-FLOW CROP PROCESSOR IN A COMBINE HARVESTER

(71) Applicant: AGCO International GmbH, Neuhausen (CH)

(72) Inventor: Thomas Mygind Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/539,845

(22) PCT Filed: Dec. 15, 2015

(86) PCT No.: PCT/EP2015/079763
§ 371 (c)(1),
(2) Date: Jun. 26, 2017

(87) PCT Pub. No.: WO2016/116225
PCT Pub. Date: Jul. 28, 2016

(65) Prior Publication Data
US 2017/0339834 A1    Nov. 30, 2017

(30) Foreign Application Priority Data
Jan. 22, 2015 (GB) .................................. 1501090.3

(51) Int. Cl.
*A01F 12/46*     (2006.01)
*A01F 7/04*      (2006.01)
*A01F 12/10*     (2006.01)

(52) U.S. Cl.
CPC ................ *A01F 12/46* (2013.01); *A01F 7/04* (2013.01); *A01F 12/10* (2013.01)

(58) Field of Classification Search
CPC .. A01F 12/46; A01F 12/10; A01F 7/04; A01F 7/00; A01F 7/02; A01F 12/18
(Continued)

(56) References Cited

U.S. PATENT DOCUMENTS 1,769,128 A * 7/1930 Fisher ..................... A01F 12/24
                                                    209/395
1,965,782 A * 7/1934 Senzek ................. A01F 12/446
                                                    460/93
(Continued)

FOREIGN PATENT DOCUMENTS

DE    2846539 A1 * 5/1979 ............. A01D 61/00
EP    2681986 A1    1/2014
(Continued)

OTHER PUBLICATIONS

UK Intellectual Property Office, International Search Report for Priority Application No. GB1501090.3, dated Jul. 3, 2015.
(Continued)

*Primary Examiner* — Thomas B Will
*Assistant Examiner* — Joan D Misa

(57) ABSTRACT

Steps to manufacturing a feed beater for a twin axial-flow crop processor in a combine harvester including cutting a flat state vane element from sheet material and bending along predetermined bend lines before being secured to a rotor core. The vane element includes a transverse vane section parallel to the rotation axis, and a directional vane section having an effective edge that extends at a non-zero angle to the rotation axis.

7 Claims, 3 Drawing Sheets

(58) Field of Classification Search
USPC .............................. 460/63, 68–70, 73, 75, 76
See application file for complete search history.

(56) References Cited

U.S. PATENT DOCUMENTS

| | | | | |
|---|---|---|---|---|
| 3,233,395 | A * | 2/1966 | Dahl | A01D 57/30 198/657 |
| 4,282,703 | A * | 8/1981 | Wilson | A01F 12/10 56/14.6 |
| 4,492,237 | A | 1/1985 | Pakosh et al. | |
| 4,653,515 | A * | 3/1987 | Tophinke | A01F 12/10 460/78 |
| 5,186,683 | A * | 2/1993 | Farley | A01F 12/16 460/105 |
| 6,729,952 | B2 * | 5/2004 | Voss | A01F 7/067 460/71 |
| 8,109,815 | B2 * | 2/2012 | Hollatz | A01F 12/10 460/16 |
| 8,556,690 | B2 | 10/2013 | Bojsen | |
| 9,043,959 | B2 * | 6/2015 | Esken | A01F 12/10 |
| 9,338,945 | B2 * | 5/2016 | Becker | A01F 12/10 |
| 9,706,714 | B2 * | 7/2017 | Bussmann | A01D 41/12 |
| 2014/0011554 | A1 | 1/2014 | Esken et al. | |
| 2015/0017394 | A1 * | 1/2015 | Johnson | B65G 33/265 428/192 |
| 2017/0339834 | A1 * | 11/2017 | Bojsen | A01F 12/46 |

FOREIGN PATENT DOCUMENTS

| | | |
|---|---|---|
| GB | 2163635 A1 | 3/1986 |
| GB | 2467182 A1 | 7/2010 |
| WO | 2015/062965 A1 | 5/2015 |

OTHER PUBLICATIONS

European Patent Office, International Search Report for Parent International Application No. PCT/EP2015/079763, dated Mar. 17, 2016.

* cited by examiner

US 10,091,941 B2

METHOD OF MANUFACTURING A FEED BEATER FOR AN AXIAL-FLOW CROP PROCESSOR IN A COMBINE HARVESTER

BACKGROUND OF THE INVENTION

Field of Invention

The invention relates to crop material beaters employed in agricultural machinery for tangential material conveyance and to a method of manufacturing such. In particular, but not exclusively so, the invention relates to feed beaters for use in conjunction with combine harvester twin-axial crop processors, the beater comprising transverse vanes aligned parallel to the rotation axis and directional vane sections for guiding the crop material at an angle to a tangential path.

Description of Related Art

Crop conveyance beaters are well-known in the field of agricultural machinery and are commonly employed on combine harvesters upstream of crop processing apparatus for conveying a cut crop flow from a feederhouse to a crop processor.

U.S. Pat. No. 8,556,690 discloses a combine harvester having a feed beater with directional vanes. Mounted on a rotor core an arrangement of crop conveyance vanes include transverse vanes (with respect to the longitudinal vehicle axis) and directional vanes disposed in a central zone and also in outboard end zones. The directional vanes are angled with respect to both the radius and the rotation axis of the rotor and serve to impart a sideways (or transverse) force on the conveyed crop material. In this example the directional vanes form V-shaped wedges in a central zone to guide the crop material away from the central zone and effectively divide the crop mat into two crop streams corresponding to the twin axial flow rotors located immediately downstream. The outboard end zones also comprise directional vanes to guide the crop mat inwardly towards respective central regions of the crop processing rotors.

SUMMARY OF INVENTION

It is an object of the invention to reduce the manufacturing costs of the crop conveyance beaters used in agricultural machinery.

In accordance with the invention there is provided a method of manufacturing a feed beater for a twin axial-flow crop processor in a combine harvester, the method comprising providing a generally cylindrical rotor core, cutting from sheet material a flat-state vane element, bending the flat state vane element along predetermined bend lines, and securing the vane element to the rotor core, the vane element comprising a transverse vane section aligned parallel to the rotation axis, and a directional vane section having an effective edge that extends at a non-zero angle to the rotation axis.

It should be understood that the term 'directional vane section' is intended to mean a vane section that imparts a sideways or transverse force upon the crop material as it passes around the beater, sometimes the vane acting in conjunction with stationary vanes mounted inside the rotor housing.

By cutting and bending the vane elements from a sheet of material, typically steel, the number of components required for such a feed beater is significantly reduced thus reducing the overall cost of manufacture. This is in contrast to known manufacturing approaches wherein the transverse vanes and directional vanes are cut and formed as separate components and welded together.

In a preferred method a pair of flat state vane elements are cut before bending the vane elements to form a handed pair each comprising a transverse vane section and a directional vane section. It should be understood that the term "handed" is intended to relate to a pair of objects which appear as a mirror image of one another, in a similar manner that helixes can be left- or right-handed.

The bent-to-shape vane elements are then secured, typically by welding, to the rotor core so that the directional vane sections together form a V-shaped wedge in a central zone of the beater with the vane portions converging in the direction of rotation.

The directional vane sections of both vane elements preferably extend beyond an apex of the wedge and abut or join together to form a substantially planar nose or leading fin. In known feed beaters having a similar construction, the nose and wedge portions of the vanes are formed from individually cut sections which are subsequently welded together. Not only do the welded joints demand more construction time but also present regions of weakness which are prone to failure. By bending a unitary flat state vane element along predetermined bend lines and joining or sandwiching the nose portion of the wedge, significant cost is taken out of the manufacturing process.

The nose preferably has a radial height which decreases in the direction of rotation and may comprise a tapered or rounded leading edge so as to avoid trapping of, and damage to, the conveyed crop material.

In a preferred embodiment the manufactured feed beater comprises a plurality of handed pairs of vane elements secured to the rotor in a circumferentially spaced relationship. Each 'handed pair' comprises a left-hand vane element and a right-hand vane element. Each handed pair forms a V-shaped wedge in the central zone wherein the directional vane sections of each handed pair extends circumferentially into an open side of an adjacent wedge.

BRIEF DESCRIPTION OF DRAWINGS

Advantages of the invention will become apparent from reading the following description of a specific embodiment with reference to the appended drawings in which:—

DETAILED DESCRIPTION OF A SPECIFIC EMBODIMENT

In the following description relative terms such as "transverse" and "longitudinal" are made with respect to the fore-and-aft longitudinal vehicle axis of a combine harvester which is parallel to the normal forward direction of travel. Moreover, the terms "axial", "radial", "tangential" and "circumferential" are used in relation to the rotation axis of the beater.

Although described in relation to a combine harvester, it should be understood that a crop conveying beater manufactured in accordance with the principles of the invention can be employed in a number of applications including combine harvesters and other agricultural machinery without deviating from the scope of the invention. However, the following description will refer to a feed beater for a combine harvester with a twin axial processor by way of example.

Figure 1:
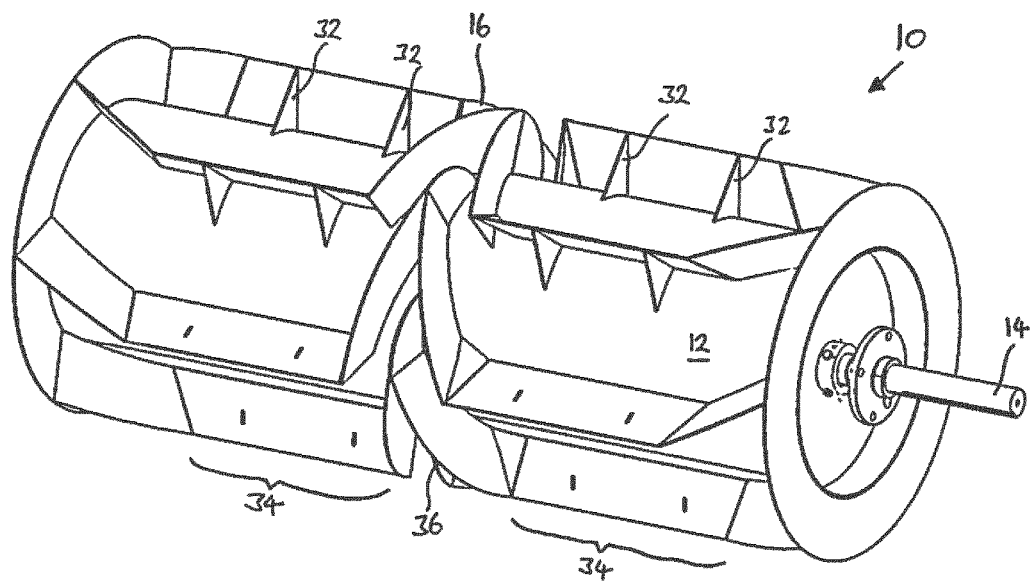
FIG. 1 is a upper rear-right perspective view of a feed beater manufactured in accordance with an embodiment of the invention.
Figure 5:
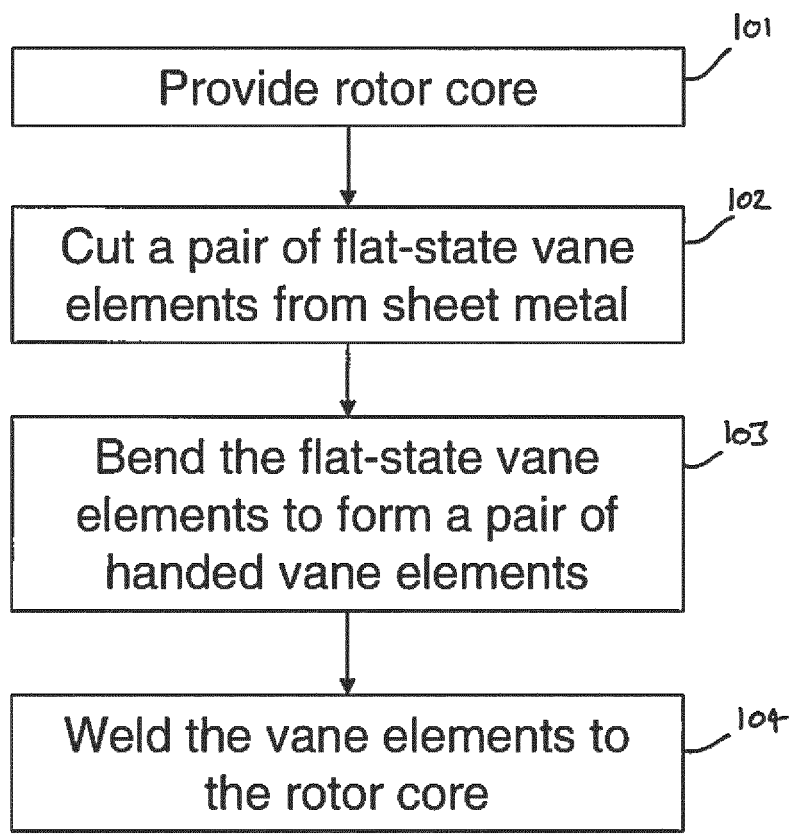

With reference to FIG. 1 a feed beater 10 comprises a generally cylindrical rotor core 12 mounted on a central shaft 14 which defines the axis of rotation. Although not shown it should be understood that shaft 14 is journaled to a combine harvester chassis for rotation. Secured to the rotor core 12 is an arrangement of crop conveying vanes designated generally at 16. The arrangement of vanes 16, and the layout of the feed rotor 10, are known in general and the invention resides in the method of manufacture to be described below and as outlined in FIG. 5.

In a first step 101 a cylindrical rotor core 12 is provided. The rotor core is preferably fabricated from sheet steel and is mounted upon shaft 14.

Figure 4:
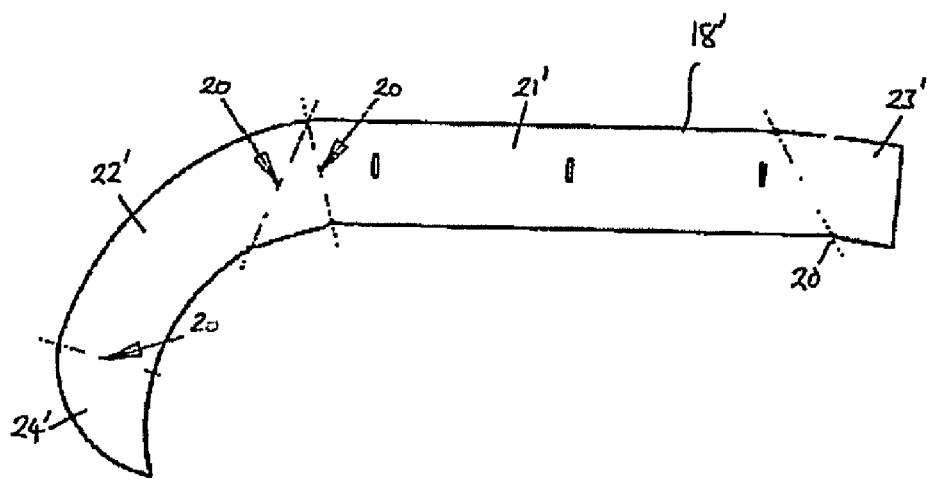
FIG. 4 shows the unitary vane element of FIG. 3 but shown in the flat state form; and, FIG. 5 is a flow chart of process steps in accordance with an embodiment of the invention.

In a second step 102 a set of vane elements are cut from sheet steel or other suitable material, the vane elements being in flat state. A single vane element is shown in FIG. 4 in flat state. Each feed beater comprises a set of vane elements 18, all of which may be cut from a single sheet if practical. Any known cutting technique may be used including laser cutting, water cutting, punching, etc.

Figure 3:
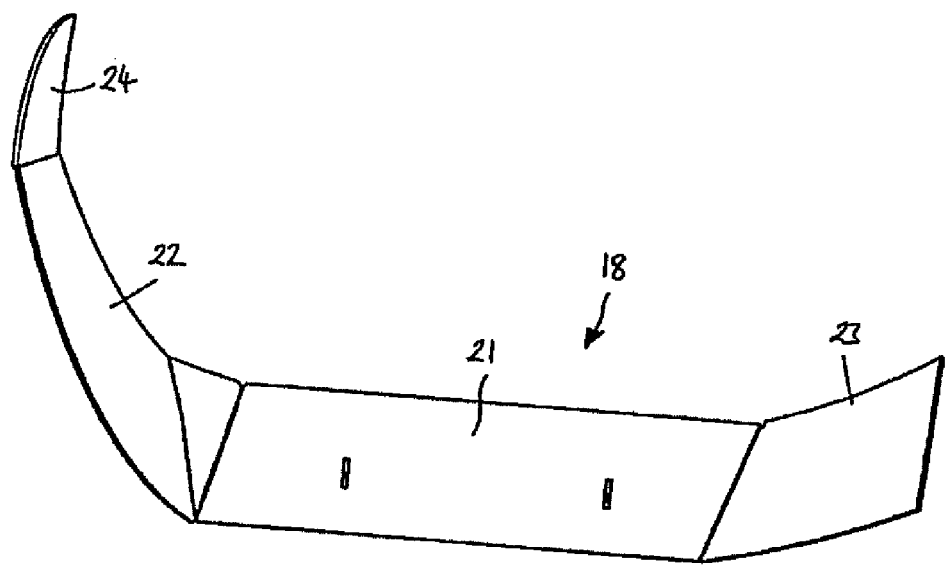
FIG. 3 shows a perspective view of a unitary vane element shown in the bent form.

In a third step 103 each vane element 18 is bent along predetermined bend lines 20 to form a 3-dimensional vane element as shown in FIG. 3. The bent or folded vane element 18 includes a straight section 21, two angled sections 22,23 on either side of straight section 21, and a nose portion 24. The corresponding sections 21',22',23' and 24' can be seen in the flat state in FIG. 4. The angled sections 22,23 correspond to directional vane sections when subsequently fitted to the rotor core 12.

Figure 2:
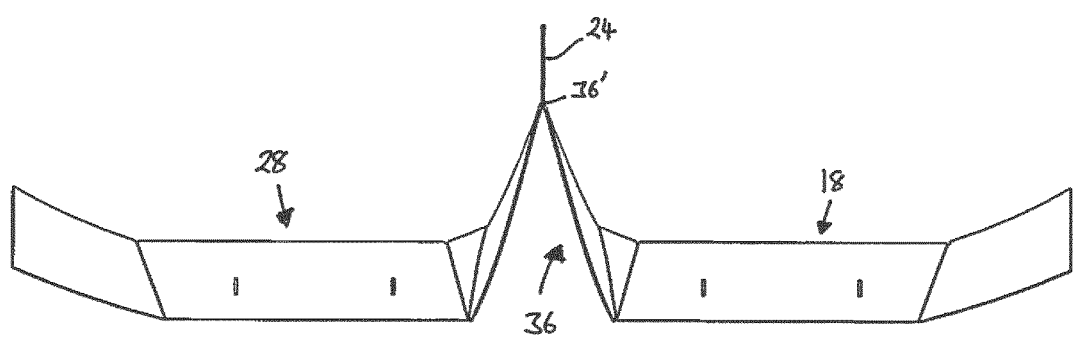
FIG. 2 shows a handed pair of vane elements embodied in the feed beater of FIG. 1.

The flat state vane elements are bent into either left-handed or right-handed versions so as to provide 'handed' pairs as shown in FIG. 2. The vane element 18 shown in FIG. 3 is a right-hand vane element corresponding to the right-hand side of the combine harvester upon which the feed beater is mounted. A left-hand vane element 28 is shown in FIG. 2 fixed to the right-hand vane element 18 by the nose section 24.

It should be understood that both right- and left-handed vane elements 18,28 can be formed from identical flat state vane elements as shown in FIG. 4 wherein the handedness is provided by bending along the bend lines 20 in different directions, namely out of, and in to, the plane of the paper respectively.

In a fourth step 104 the vane elements 18,28 are welded to the rotor core 12 to provide a vane arrangement 16 as shown in FIG. 1. Triangular fillet members 32 may also be welded between the vane elements and rotor core to strengthen the structure.

The straight sections 21 of the vane elements 18,28 provide respective transverse vane sections 34 and are repeated around the circumference of the rotor core 12, the transverse vane sections being aligned parallel to the rotation axis 14 and serving propel crop material tangentially.

First angled sections 22 and nose sections 24 serve, when attached to the rotor core 12, as directional vane sections together forming a V-shaped wedge 36 in a central zone of the beater 10, wherein the wedge converges in the direction of rotation indicated by arrow A. At the apex 36' of each wedge 36 each vane element 18,28 extends circumferentially in the direction of rotation A to form the leading nose portion 24.

It should be understood that the term "directional vane" refers to structure on the rotor core 12 which imparts a sideways conveying force on the crop material which passes tangentially under the beater 10. Such directional vane sections are also provided by angled sections 23 located at the outboard ends of the beater 10 to guide crop material inwardly.

The apex 36' and nose portion 24 circumferentially overlap with the wedge opening corresponding to the adjacent pair of vane elements as best seen in FIG. 1. However it should be understood that the invention is not limited to the precise vane element arrangement 16 shown in FIG. 1.

In summary, the invention involves the recognition that directional vanes and transverse vanes can be formed from unitary vane elements cut and bent to shape before securing to the rotor core 12. The nose portion 24 which exists in known feed beater arrangements can be advantageously exploited to provide a location for a welded joint connecting the vane elements.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A method of manufacturing a feed beater for a twin axial-flow crop processor in a combine harvester, the method comprising:
providing a generally cylindrical rotor core;
cutting from sheet material a pair of flat-state vane elements,
bending the pair of flat state vane element along predetermined bend lines to form a handed pair of vane elements;
welding the respective directional vane sections together around an edge of a substantially planar nose; and
securing the vane elements to the rotor core, each one of the handed pair of vane elements comprising:
a transverse vane section aligned parallel to a rotation axis, and
a directional vane section having an effective edge that extends at a non-zero angle to the rotation axis;
wherein the respective directional vane sections together form a V-shaped wedge in a central zone of the beater, wherein the wedge converges in the direction of rotation;
wherein the directional vane sections of both said vane elements extend circumferentially beyond an apex of the wedge and abut to form the substantially planar nose.

2. The method according to claim 1, wherein the nose has a radial height that decreases in the direction of rotation.

3. The method according to claim 1, wherein the handed pair of vane elements is one of a plurality of handed pairs of vane elements, each of the plurality of handed pairs of vane elements being secured to the rotor in a circumferentially-spaced relationship, each handed pair of vane elements forming a respective V-shaped wedge in the central zone, and wherein the directional vane sections of each handed pair of vane elements extend circumferentially into an open end of an adjacent V-shaped wedge.

4. The method of claim 1, wherein each vane element of the handed pair of vane elements comprises an additional directional vane section on a side of said transverse vane section located at an outboard end of the beater.

5. The method according to claim 1, comprising welding the handed pair of vane elements to the rotor core.

6. The method according to claim 1, comprising securing strengthening fillet elements to the rotor core and to the handed pair of vane elements.

7. The feed beater manufactured according to claim 1.

* * * * *